US011600206B2

United States Patent
Bühlmeyer et al.

(10) Patent No.: US 11,600,206 B2
(45) Date of Patent: Mar. 7, 2023

(54) SYSTEM FOR POWERING MULTIPLE ELECTRONIC DISPLAY DEVICES FOR DISPLAYING GOODS-RELATED INFORMATION, AND GOODS PRESENTATION SYSTEM

(71) Applicant: Rehau AG + Co., Rehau (DE)

(72) Inventors: Christian Bühlmeyer, Vienna (AT); Jörg Goldstein, Hof (DE); Stefan Eibl, Hof (DE); Ansgar Niehoff, Rehau (DE); Peter Michels, Hof (DE); Holger Fritzlar, Cologne (DE); Steven Schmidt, Döhlau (DE)

(73) Assignee: REHAU INDUSTRIES SE & CO. KG, Rehau (DE)

( * ) Notice: Subject to any disclaimer, the term of this patent is extended or adjusted under 35 U.S.C. 154(b) by 930 days.

(21) Appl. No.: 16/467,963

(22) PCT Filed: Dec. 19, 2017

(86) PCT No.: PCT/EP2017/083550
§ 371 (c)(1),
(2) Date: Sep. 29, 2019

(87) PCT Pub. No.: WO2018/114954
PCT Pub. Date: Jun. 28, 2018

(65) Prior Publication Data
US 2020/0074891 A1    Mar. 5, 2020

(30) Foreign Application Priority Data
Dec. 20, 2016  (DE) .......................... 102016124956.4

(51) Int. Cl.
*G09F 3/20*    (2006.01)
*A47F 5/00*    (2006.01)
(Continued)

(52) U.S. Cl.
CPC ............ *G09F 3/204* (2013.01); *A47F 5/0068* (2013.01); *G09F 3/18* (2013.01); *G09F 3/208* (2013.01);
(Continued)

(58) Field of Classification Search
CPC . G09F 3/204; G09F 3/18; G09F 3/208; G09F 7/18; G09F 2007/1843;
(Continued)

(56) References Cited

U.S. PATENT DOCUMENTS

| 3,295,093 | A | | 12/1966 | Manfred et al. | |
| 5,348,485 | A | * | 9/1994 | Briechle | ................ H01R 25/14 439/121 |

(Continued)

FOREIGN PATENT DOCUMENTS

| DE | 20221024 | 2/2005 |
| DE | 202015105014 | 9/2015 |

(Continued)

OTHER PUBLICATIONS

"Panasonic: NRF Big Show 2015 Panasonic Introduces Intelligent Retail Shelving Solution at NRF 2015 Powershelf Combines Live on Shelf Inventory Awareness, Mobile Phone Advertising, Dynamic Price Adjustments and More to Improve Profitability and Customer Satisfaction," Jan. 11, 2015, pp. 1-4, XP055458103.

(Continued)

*Primary Examiner* — Ko H Chan
(74) *Attorney, Agent, or Firm* — Aird & McBurney LP

(57) ABSTRACT

The invention relates to a system (10) for powering display devices (11) for displaying goods-related information, comprising an elongate base body (12) and at least one closure device (14). The main part (12) has a channel (16) for receiving the display devices (11), and the main part (12) has two end portions (18). Each end portion (18) has one of two (Continued)

Figure 1:
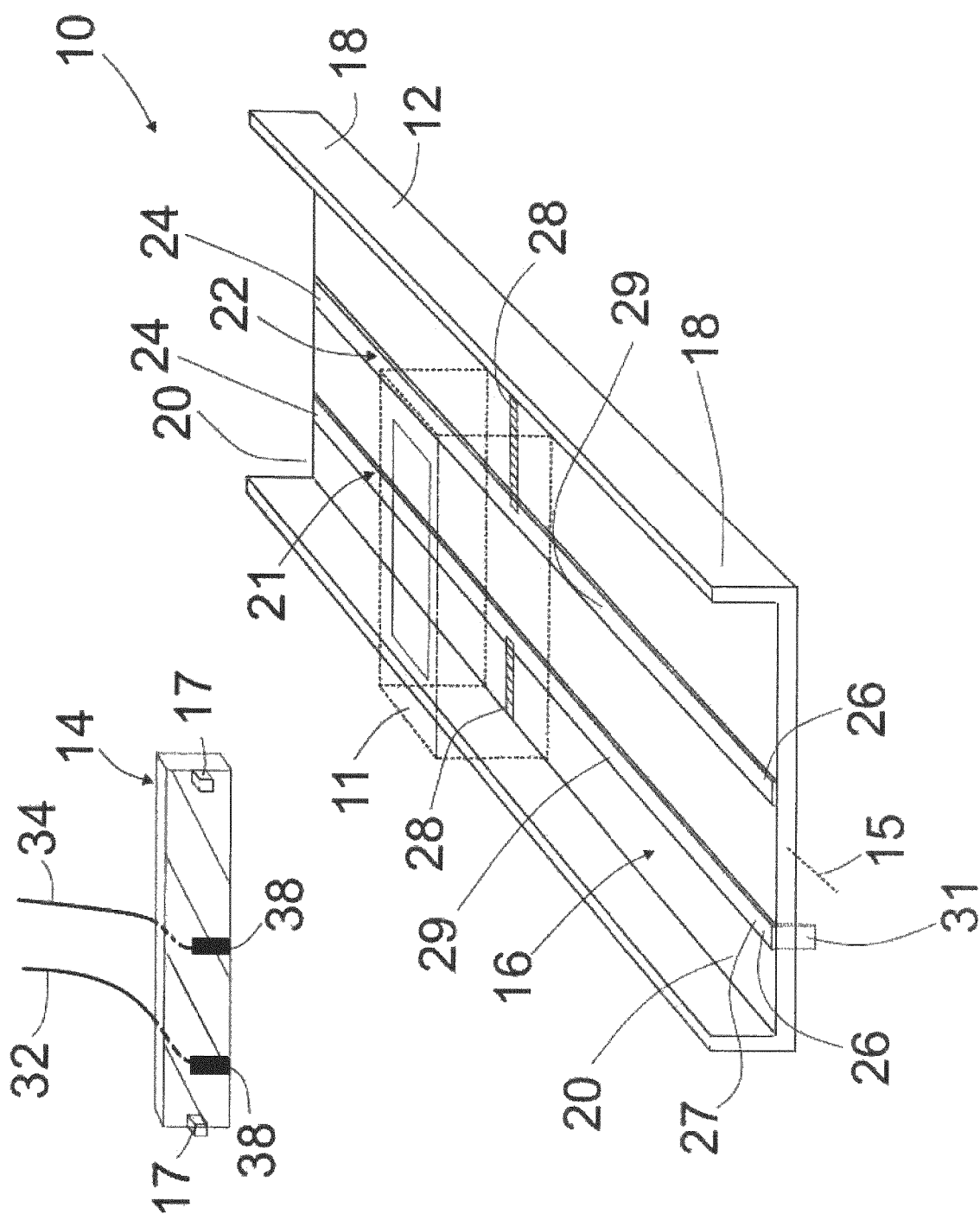

channel (16) end portions (20) in which the display devices (11) can be received. The system (10) has at least two current conductors (21, 22) which are arranged in the channel (16), and a power supply contact (28) of each display device (11) can be contacted with a respective current conductors (21, 22) by receiving the display devices (11) in the channel (16). By connecting the closure device (14) to the end portion (18) of the main part (12), a respective supply line (32, 34) of the closure device (14) can be contacted with the current conductors (21, 22). The invention also relates to a goods presentation system and to a method.

13 Claims, 10 Drawing Sheets

(51) Int. Cl.
| G09F 7/18 | (2006.01) |
| G09F 3/18 | (2006.01) |
| H02G 3/04 | (2006.01) |
| F21V 21/35 | (2006.01) |
| F21W 131/40 | (2006.01) |

(52) U.S. Cl.
CPC .............. *G09F 7/18* (2013.01); *H02G 3/0437* (2013.01); *F21V 21/35* (2013.01); *F21W 2131/40* (2013.01); *G09F 2007/1843* (2013.01)

(58) Field of Classification Search
CPC ...... A47F 5/0068; A47F 5/0869; A47F 3/001; A47F 11/10; A47F 5/0043; A47F 5/10; H02G 3/0437; F21V 21/35; F21V 23/008; F21W 2131/40; H01R 25/147; A47B 2220/0077; F21Y 2103/10
See application file for complete search history.

(56) References Cited

U.S. PATENT DOCUMENTS

| 5,690,415 | A * | 11/1997 | Krehl ........................ F21S 8/00 |
| | | | 362/370 |
| 6,231,205 | B1 | 5/2001 | Slesinger et al. |
| 6,964,371 | B2 * | 11/2005 | Huang .................... G09F 3/204 |
| | | | 235/383 |
| 7,163,305 | B2 * | 1/2007 | Bienick ................... A47F 11/10 |
| | | | 362/125 |
| 8,915,609 | B1 * | 12/2014 | Shah ...................... H05B 45/30 |
| | | | 362/648 |
| 9,098,823 | B2 * | 8/2015 | Slesinger ............. H01R 25/142 |
| 9,130,326 | B2 * | 9/2015 | Meis ...................... A47B 57/40 |
| 9,332,864 | B2 * | 5/2016 | Poggi ................... A47B 96/021 |
| 9,831,642 | B2 * | 11/2017 | Woodley ............ A47B 96/1425 |
| 9,883,756 | B2 * | 2/2018 | Kraiss ...................... H02B 1/20 |
| 10,976,191 | B2 * | 4/2021 | Bühlmeyer ............. A47F 10/02 |
| 11,091,958 | B2 * | 8/2021 | Wanta ....................... E06C 9/02 |
| 2003/0103347 | A1 * | 6/2003 | Friend ...................... G08B 5/36 |
| | | | 362/225 |
| 2004/0160767 | A1 * | 8/2004 | Mobarak ................. F21V 21/35 |
| | | | 362/219 |
| 2008/0043456 | A1 * | 2/2008 | Bernardini .............. F25D 25/02 |
| | | | 362/125 |
| 2008/0106892 | A1 * | 5/2008 | Griffiths ................ F21V 15/015 |
| | | | 362/373 |
| 2014/0055987 | A1 | 2/2014 | Lindblom et al. |
| 2014/0201041 | A1 | 7/2014 | Meyer |
| 2019/0301791 | A1 * | 10/2019 | Wantland ............... H01R 31/02 |

FOREIGN PATENT DOCUMENTS

| EP | 0558305 | 9/1993 |
| FR | 2671471 | 7/1992 |
| WO | 2005033645 | 4/2005 |
| WO | 2016205629 | 12/2016 |

OTHER PUBLICATIONS

"Powershelf: Power at the Shelf," Feb. 2, 2015, pp. 1-13, XP055458107, Retrieved From the Internet: URL:http://powershelf.net/wordpress/, Retrieved on Mar. 9, 2018.
Translation of Abstract of DE 20221024.
Translation of Abstract of FR 2671471.
Translation of Abstract of DE 202015105014.
International Search Report for PCT/EP2017/083565 dated Mar. 20, 2018.
Translation of International Search Report for PCT/EP2017/083565 dated Mar. 20, 2018.
Written Opinion of the International Searching Authority for PCT/EP2017/083565 dated Mar. 20, 2018.
Translation of Written Opinion of the International Searching Authority for PCT/EP2017/083565 dated Mar. 20, 2018.
International Preliminary Report on Patentability for PCT/EP2017/083565 dated Jun. 25, 2019.
International Search Report for PCT/EP2017/083550 dated Mar. 16, 2018.
Translation of International Search Report for PCT/EP2017/083550 dated Mar. 16, 2018.
Written Opinion of the International Searching Authority for PCT/EP2017/083550 dated Mar. 16 2018.
Translation of Written Opinion of the International Searching Authority for PCT/EP2017/083550 dated Mar. 16, 2018.
International Preliminary Report on Patentability for PCT/EP2017/083550 dated Jun. 25, 2019.
International Search Report for PCT/EP2017/083462 dated Mar. 13, 2018.
Translation of International Search Report for PCT/EP2017/083462 dated Mar. 13, 2018.
Written Opinion of the International Searching Authority for PCT/EP2017/083462 dated Mar. 13, 2018.
Translation of Written Opinion of the International Searching Authority for PCT/EP2017/083462 dated Mar. 13, 2018.
International Preliminary Report on Patentability for PCT/EP2017/083462 dated Jun. 25, 2019.

* cited by examiner

SYSTEM FOR POWERING MULTIPLE ELECTRONIC DISPLAY DEVICES FOR DISPLAYING GOODS-RELATED INFORMATION, AND GOODS PRESENTATION SYSTEM

CROSS REFERENCE TO RELATED APPLICATION

The instant application is a National Stage of PCT International Patent Application Serial No. PCT/EP2017/083550 filed Dec. 19, 2017, which claims priority to German Patent Application Serial No. 102016124956.4 filed Dec. 20, 2016, the entire specifications of both of which are expressly incorporated herein by reference.

The present invention relates to a system for powering multiple electronic display devices for displaying goods-related information. Further, the invention relates to a goods presentation system having such a system for powering multiple display devices for displaying goods-related information.

In the retail sector, in particular in supermarkets and chemist's shops, display devices are increasingly being used for displaying product-related information, these being provided in particular to display the price of goods. Known typical display devices for displaying goods-related information are usually in the form of what are called ESLs (electronic shelf labels), which are also referred to as electronic price tags. ESLs and a receptacle for them are known e.g. from DE 20 2015 105 014 U1.

Typically, the display devices are arranged in the immediate vicinity of the respective goods, so that the potential buyer can link the goods-related or product-related information displayed by the display device directly with the respective product or the respective goods. In particular in a supermarket or chemist's shop with many different goods, therefore as a rule a very large number of display devices are used for displaying goods-related information. When installing or assembling the display devices it is in particular necessary to produce a power supply or voltage supply for all the display devices, which involves a large amount of cabling.

The object of the present invention is therefore to reduce the amount of cabling for providing the power supply for multiple display devices for displaying product-related information.

This object is achieved according to the invention with a system for powering multiple display devices for displaying goods-related information having the features of claim 1.

Preferred embodiments of the system for powering multiple display devices for displaying goods-related information are described in the dependent claims.

The system according to the invention for powering multiple display devices for displaying goods-related information comprises an elongate base body made of a plastics material, and at least one closure means. The base body, which is preferably an extruded base body or a base body produced by extrusion, comprises a channel extending over the entire length of the base body for receiving the display devices, or the base body comprises an elongate receptacle extending over the entire length of the base body for receiving the display devices.

The channel or the receptacle extends over the entire length of the base body, or the channel or the receptacle extends from one of two opposed ends of the base body up to the other of the two opposed ends of the base body.

The base body comprises two opposed end portions, or the base body comprises two end portions which are opposed running lengthwise to each other, with each of the end portions of the base body having one, or in each case one of two, opposed channel end portions of the channel, or having one, or in each case one of two, channel end portions of the channel which are opposed running lengthwise to each other (or having one of two opposed receptacle end portions of the receptacle, or having one of two receptacle end portions of the receptacle which are opposed running lengthwise to each other), or with in each case one channel end portion or one receptacle end portion being located on one in each case of two end portions which are opposed—or opposed running lengthwise to each other—of the base body.

The display devices can be received in the channel, wherein the display devices in the channel for producing a row of successively arranged display devices preferably along the longitudinal axis of the base body in succession can be received in the channel, or can be received or can be received in succession in the channel, forming a row extending along the longitudinal axis of the base body. This arrangement in rows advantageously makes it possible to arrange the system in the vicinity of goods shelving, in which case in each case one display device can be associated directly with the associated goods by the potential buyer or prospective buyer, namely with the goods from multiple goods which are likewise placed or arranged in succession in rows on a storage device or a shelf element of goods shelving.

The channel of the base body which is provided or is set up for receiving the display devices extends over the entire length of the base body. The channel is particularly preferably a channel oriented parallel to the longitudinal axis of the base body, or the channel is particularly preferably an elongate channel oriented parallel to the longitudinal axis of the base body. If it is preferably an extruded base body, the channel is a channel formed when extruding the base body. As a result of it extending over the entire length of the base body, the channel or the receptacle is open or accessible on both end faces of the base body. Particularly preferably, the channel is also open or accessible on one long side of the base body, so that the display devices can be received in the channel from the long side. This has the advantage that the display devices in order to produce a series of display devices arranged in succession on the base body do not have to be inserted into the channel one after another on the end face, which may prove difficult as a result of skewing depending on the embodiment of the channel.

The or each of the display device(s) can be received in the channel, with the or each display device being able to be received in particular in force-fitting manner in the channel. Particularly practically, the or each display device by being received in the channel can form a detachable snap connection with the extruded base body.

The system according to the invention comprises at least two current conductors, wherein each of the current conductors comprises two current-conductor end portions and an intermediate portion. The intermediate portion of each current conductor is arranged in the channel, and one in each case of the current-conductor end portions of each current conductor is arranged in one in each case of the two opposed channel end portions with at least a partial portion.

The current conductors which are spaced apart from each other may be current conductors of a design which is familiar to the person skilled in the art. For example, the current conductors may be in particular in the form of printed conductors, the printed conductors possibly being e.g. printed conductors made of copper, of tin-plated copper, of copper-plated aluminum or of zinc-plated aluminum or of copper-plated gold, or of silver, or of graphite, or of conductive polymers (such as PEDOT:PSS, PANI, etc.), or of various carbon modifications (such as CNTs, fullerene, etc.). The printed conductor, for being held in the channel, may e.g. be extruded or laminated or printed onto the plastics material of the base body, or each of the printed conductors, for being held in the channel, may be in the form of an elongate partial piece of an elongate conductive body, with a further partial piece of the elongate conductive body possibly being e.g. extruded, pressed, glued or clipped into the plastics material of the extruded base body.

The system according to the invention is distinguished firstly in that by the display devices being received in the channel in each case a power supply contact of each display device or a power port of each display device can be contacted in electrically conductive manner with one in each case of the current conductors. Or in other words, by the display devices being received in the channel, in each case one power supply contact can be contacted in electrically conductive manner with one in each case of the current conductors by each display device.

Thus advantageously in a simple and practical manner, for each display device for displaying goods-related information which is to be received in the channel, contacting of the current conductors arranged in the channel with the power supply contacts or voltage supply contacts of the display devices or with the power ports or the voltage supply connectors of the display devices which is necessary for supplying power to the display devices can be produced.

Further, the system according to the invention is distinguished in that the closure means (or the at least one closure means) comprises at least two electrical supply lines which are provided for producing a connection to a current source or which are provided for connecting to a current source, wherein the closure means can be connected to at least one of the two opposed end portions of the base body, and wherein by connecting the closure means to the end portion of the base body in each case an end portion (or supply-line end portion) of each of the supply lines can be contacted in electrically conductive manner with at least one current-conductor end portion of the current-conductor end portions, which are arranged in the channel end portion of the end portion with at least a partial portion.

The ability, provided according to the invention, of the power supply contacts of each of the display devices to contact with the current conductors arranged in the channel by the display devices being received in the channel, together with the electrical contacting of the supply-line end portions of the closure means with the current-conductor end portions of the current conductor, which can be produced by simply connecting the closure means to the end portion, advantageously makes possible the provision, which can be realized in a very simple and practical manner, of the power supply or voltage supply of the display devices by way of the electrical supply lines of the closure means, which are provided for producing a connection to a current source or an external current source, or which are provided for producing an electrically conductive connection to a current source or an external current source or a voltage source or an external voltage source. The power supply to all the display devices can therefore be produced in simple manner in that the display devices are received in the channel, the closure means is connected to the end portion of the base body, thereafter the supply lines of the closure means are connected to a current source, or electrically conductive connections of the supply lines to a current source are produced and the display devices are powered from the current source by way of the supply lines or are supplied with a supply voltage, this possibly taking place e.g. in the case of a DC source in that one of the supply lines is connected to the positive pole of the current source and the other one of the two supply lines is connected to the negative pole of the current source. Viewed overall, as a result of the power supply of the display devices which can be produced in very simple manner by means of the system according to the invention, the amount of cabling for providing the power supply can be reduced or reduced considerably. Once the display devices have been received in the channel, merely the supply lines have to be connected to the respective current source or voltage source. Costly cabling of each individual display device, as is the case with known solutions, can advantageously be dispensed with. Thus, the wiring effort, and hence in particular also wiring costs, can be reduced considerably.

The display devices for displaying goods-related information or product-related information may be common or known display devices which are provided or set up for displaying goods-related information or product-related information. In particular, they may be display devices which are in the form of what are called ESLs (electronic shelf labels), which [which] are also referred to as electronic price tags. Size-wise, these display devices may have a length within a range of 2 to 125 cm, a height within a range of 2 to 50 cm, and a thickness within a range of 0.2 to 2 cm.

The goods-related information may be any information whatsoever about the respective goods, i.e. e.g. about the price of the goods, the designation of the goods, the use-by date, the weight etc.

With the system according to the invention, each of the current conductors comprises two current-conductor end portions, of which one in each case is arranged in one of the two opposed channel end portions with at least a partial portion. That is to say, therefore, that with one of the current conductors a first one of the two current-conductor end portions is arranged in a first one of the two opposed channel end portions with at least a partial portion, and the second current-conductor end portion of this current conductor is arranged in the second of the two opposed channel end portions with at least a partial portion. An intermediate portion [portion] of the respective current conductor, which extends from the first current-conductor end portion up to the second current-conductor end portion, or which connects the first current-conductor end portion to the second current-conductor end portion, is then arranged in a middle region of the channel which extends from the first channel end portion up to the second channel end portion. It goes without saying that each of the current conductors is particularly preferably formed in rectilinear manner and particularly preferably extends parallel or substantially parallel to the longitudinal axis of the extruded base body. In particular, each current conductor can extend over the entire length of the channel. However, this is of course not imperative. According to the invention, it is merely necessary to achieve that, by the display devices being received in the channel, in each case one power supply contact of each display device can be contacted in electrically conductive manner with in each case one of the current conductors. This contacting ability may be produced in a manner familiar to the person skilled in the art in particular by suitably adapting the dimensions of the channel to the relevant dimensions of the display devices.

The closure means comprises at least two electrical supply lines which are provided for producing a connection to a current source or for connecting to a current source. It goes without saying that the supply lines at least in portions may be in particular current-conducting conductors or inner conductors or cores of a supply cable, which particularly preferably are current-conducting conductors or inner conductors of a single supply cable.

It goes without saying that each of the current-conductor end portions may also be e.g. in the form of a current-carrying contact of a plug or mating plug. It also goes without saying that each of the supply-line end portions may also be in the form of a current-carrying contact of a corresponding mating plug or plug, so that by connecting the closure means to the end portion of the base body also plug connections can be formed in order to achieve the electrically conductive contact or the electrically conductive connection between the supply-line end portions and the current-conductor end portions.

The closure means can be connected to at least one of the two opposed end portions of the base body, the closure means being able to be connected to the end portion of the base body particularly preferably in force-fitting manner. In particular, the closure means may preferably have an insertable member which to form a force-fitting connection to the extruded base body can be inserted into the channel of the extruded base body on the end face.

Particularly preferably, the closure means can be connected detachably or manually detachably to at least one of the two opposed end portions of the base body, so that the closure means can advantageously be detached from the extruded base body and also optionally reconnected thereto in particular for maintenance purposes or repair purposes.

By connecting the closure means to the end portion of the base body, in each case a supply-line end portion of each of the supply lines can be contacted in electrically conductive manner with in each case one current-conductor end portion of the current-conductor end portions, which are arranged in the channel end portion of the end portion with at least a partial portion. This contacting ability may be produced in a manner familiar to the person skilled in the art in particular by suitably arranging the supply-line end portions. Thus for example each of the supply-line end portions in the case of an existing connection between the base body and closure means may project in particular into the channel of the base body in order to produce the contact with the current-conductor end portions, which are arranged in the channel in each case with at least a partial portion.

Each current conductor comprises two current-conductor end portions, of which one in each case is arranged in one of the two opposed channel end portions with at least a partial portion. The respective current-conductor end portion is therefore arranged with at least a partial portion in one of the two opposed channel end portions, so that therefore the respective current-conductor end portion can in particular also be completely or entirely arranged in the respective channel end portion or can be arranged in the channel, namely without protruding from the channel end portion. According to the invention, however, provision may also be made for only a partial portion of the respective current-conductor end portion to be arranged in the channel end portion, so that a further partial portion of the respective current-conductor end portion can therefore be arranged in particular also outside the respective channel end portion or can protrude from the respective channel end portion.

The plastics material of which the elongate base body consists may for example be thermoplastic materials, thermoset plastics and elastomers. Preferred thermoplastic materials are: PVC, ABS, ASA, PET, PC, PS, PA, and also all the plastics materials from the group of polyolefins, polyacrylates, polycarbonates and polyesters.

In one preferred embodiment of the system according to the invention, the closure means comprises a flat body or a flat element made of a plastics material with two opposed sides, and at least one insertable member made of a plastics material which is connected to one of the two sides, wherein the insertable member for connecting the closure means to the end portion of the base body can be received in force-fitting manner in the channel by inserting it into the channel on the end face. By means of this closure means, a connection of the supply-conductor end portions to the current-conductor end portions can be produced in a very simple and practical manner by a simple insertion operation. Providing the flat body advantageously makes a weight-saving and visually attractive design of the flat body possible. The insertable member, for connecting the closure means to the end portion of the base body, by being inserted into the channel on the end face can be received in force-fitting manner or can be received entirely or at least partially in the channel, or the insertable member, for connecting the closure means to the end portion of the base body, by being inserted into the channel on the end face can be held in the channel particularly preferably in clamping manner or can be held in the channel, forming a clamping tension. It goes without saying that the connection between the closure means and the base body which can be produced by means of this preferred embodiment can particularly preferably be a detachable or manually detachable connection. The insertable member may therefore particularly preferably be able to be pulled out of the channel or be able to be manually pulled out of the channel. Owing to the detachability of the connection between the closure means and the base body which is preferably provided, advantageously in particular maintenance work or repairs can be carried out in a simple and practical manner.

The plastics material of which the flat body and the insertable member consist may for example be thermoplastic materials, thermoset plastics and elastomers. Preferred thermoplastic materials are: PVC, ABS, ASA, PET, PC, PS, PA, and also all the plastics materials from the group of polyolefins, polyacrylates, polycarbonates and polyesters.

The supply-line end portions which can be contacted with the current-conductor end portions are particularly preferably provided on the insertable member. Since the insertable member can be received in force-fitting manner in the channel by inserting it, advantageously also stable electrically conductive contacting of the supply-line end portions with the current-conductor end portions can be produced by providing the supply-line end portions on the insertable member.

Particularly preferably, the end face of the base body can be covered by the flat element by inserting the insertable member into the channel on the end face. Due to the possibility of coverage provided thereby, a visually very attractive closure can be produced. In particular, the flat element may have a design which advantageously by inserting the insertable member into the channel on the end face can be connected flush to the base body, accompanied by the creation of a visually very attractive closure.

In one practical embodiment of the system according to the invention, the system comprises at least one data line, wherein the data line has an intermediate portion and two data-line end portions, wherein the intermediate portion of the data line is arranged in the channel and one in each case of the data-line end portions is arranged in one in each case of the two opposed channel end portions with at least a partial portion, wherein by the display devices being received in the channel in each case a data line connector of each display device can be connected for data transmission to the data line, wherein the closure means has at least one data supply line which is provided for producing a data-transmitting connection to a data source, wherein by connecting the closure means to the end portion of the base body an end portion of the data supply line can be connected for data transmission to that data-line end portion which is arranged in the channel end portion of the end portion of the base body with at least a partial portion.

By the display devices being received in the channel, in each case a data line connector of each display device can be connected for data transmission to the data line. Or in other words, by the display devices being received in the channel in each case a data line connector can be connected for data transmission to the data line by each display device.

Analogously to what has been set forth above in conjunction with the provision of the power supply for the display devices, by means of this practical embodiment of the system according to the invention a data supply of all the display devices can be produced in simple manner in that the display devices are received in the channel, the closure means is connected to the end portion of the base body, thereafter a data-transmitting connection of the at least one data supply line of the closure means—which in this practical embodiment is provided in addition to the electrical supply lines—to a data source is produced. The data of the data source may be in particular typical goods-related data (such as the price of goods), which can be transmitted from the data source, such as a server, the electronic display devices by way of the at least one data supply line, the data line which is arranged at least in portions in the channel, and the respective data line connectors of the display devices, to the display devices for further digital processing. It goes without saying that by way of this data transmission path in particular also bidirectional data communication between the data source and the respective display device can be able to be produced, provided that for this a correspondingly set up data supply line and a data line correspondingly set up for this are present.

In the above practical embodiment too, the supply-line end portions which can be contacted with the current-conductor end portions and the end portion of the data supply line which can be connected to one of the data-line end portions (or data-line end portions) can be provided on the insertable member of the preferred embodiment described above of the system according to the invention. Since the insertable member can be received in force-fitting manner in the channel by inserting it, advantageously also stable electrically conductive contacting of the supply-line end portions with the current-conductor end portions can be produced by providing the supply-line end portions and the data-line end portion on the insertable member. Further, thereby also a stable data-transmitting connection of the end portion of the data supply line of the closure means to the data-line end portion, which is arranged with at least a partial portion in the respective channel end portion, can be produced.

The system according to the invention is provided particularly advantageously for arranging in the vicinity or in the immediate vicinity of storage devices, such as shelf elements of goods shelving, wherein the extruded base body of the system for this can particularly preferably be able to be attached to a shelf element of goods shelving, so that a buyer or a potential buyer of goods can directly identify the display device associated with the goods in each case.

The base body is advantageously an extruded base body made of a plastics material, i.e. a base body produced by extrusion. By means of extrusion, in automated manufacture a large number of base bodies of consistently high quality can be manufactured. The plastics material of which the base body consists may for example be thermoplastic materials, thermoset plastics and elastomers. Preferred thermoplastic materials are: PVC, ABS, ASA, PET, PC, PS, PA, and also all the plastics materials from the group of polyolefins, polyacrylates, polycarbonates and polyesters.

The invention also relates to a goods presentation system comprising a system according to the invention for powering multiple electronic display devices, at least two or more holding posts and at least one or more storage devices. In the case of the goods presentation system, the or each storage device has a storage element for storing goods or a deposition element for depositing goods and two holding elements, wherein the holding elements are connected to the storage element, wherein each holding post has at least one receptacle or multiple receptacles in which one in each case of the holding elements for holding the storage device on the holding posts can be received, wherein at least one of the holding posts has at least two electrical conductors which are provided for connecting to a current source, wherein at least one of the holding elements has at least two electrical connection elements, or wherein at least one of the holding elements has at least two electrically conductive connection elements, wherein one in each case of the supply lines of the closure means can be connected to each connection element, wherein each connection element by the holding element being received in the receptacle of the holding post can be contacted in electrically conductive manner with one in each case of the conductors of the holding post.

The goods presentation system according to the invention is characterized in that it combines the advantages of the above system according to the invention with at least two holding posts and at least one storage device. The holding posts and the at least one storage device, which can advantageously form goods shelving, are distinguished in that by way of the electrical conductors of the holding posts and the electrical connection elements of the holding elements after connecting the supply lines of the closure means to the connection elements, by the holding elements being received, which can be carried out in simple manner, in the receptacles of the holding posts—namely for holding or attaching the storage device on or to the holding posts—and subsequently connecting the conductors of the holding post to a current source, electrically conductive connections of the supply lines of the closure means to the current source can be produced, namely for powering or for voltage supply of electronic display devices received in the channel of the base body of the powering system according to the invention.

Each holding post has at least one receptacle or multiple receptacles, in which one in each case of the holding elements for holding the storage device on the holding posts can be received. In particular, each of the holding elements may have an end region which can be hung in the respective receptacle, wherein the electrical connection elements can be provided on the end region. In particular, the conductors of the holding posts may be arranged in a longitudinal channel of the holding post, wherein in the hung state of the end region an electrically conductive contact with the respective electrical conductor of the holding post is present for each connection element.

Preferably the elongate base body of the system according to the invention for powering the multiple electronic display devices can be attached to the storage device or can be connected to the storage device.

In particular, the elongate base body, in the case of a storage element which is formed in elongate manner, can be particularly preferably attached to the storage device in an arrangement in which a face of the base body which extends along the longitudinal axis of the base body faces a face of the storage element which extends along the longitudinal axis of the storage element. Or in other words, in particular, the elongate base body in the case of a storage element which is formed in elongate manner can particularly preferably be attached to the storage device such that a face of the base body which extend along the longitudinal axis of the base body faces a face of the storage element which extends along the longitudinal axis of the storage element.

In this arrangement, in which the channel of the base body of the powering system extends particularly preferably parallel to the longitudinal axis of the storage element, the buyers or the potential buyers can advantageously make a direct link to the display device provided for the respective goods.

The ability which is preferably present to attach or connect the base body to or with the storage device may be produced e.g. by way of suitable regions of the base body, which may be in the form of holding elements or connecting elements, by way of which the base body can be attached or can be connected to the storage device. For example, the base body could have at least one hook-shaped region by way of which the base body can be hooked into or hung on the storage device. For example, regions of the base body in the form of receiving bodies, which can be received in force-fitting manner in receptacles provided on the storage device, are also conceivable.

In one practical embodiment of the goods presentation system according to the invention, it has a system for powering the display devices in accordance with the above practical embodiment with the at least one data line, with at least one of the holding posts having at least one data line which is provided for connecting to a data source, with at least one of the holding elements having at least one data line connector, with the data supply line of the closure means being able to be connected to the data line connector, with the data line connector being able to be connected for data transmission to the data line by being received in the receptacle of the holding post.

Analogously to the above embodiments, the holding posts and the at least one storage device, which advantageously together can form goods shelving, are distinguished in that by way of the at least one data line of the holding post and the data line connector of the holding element or elements after connecting the data supply line of the closure means to the data line connector by the holding elements being received, which can be performed in simple manner, in the receptacles of the holding posts— namely for holding or attaching the storage device to the holding posts—and subsequently connecting the data line of the holding post to a data source, a data-transmitting connection of the data supply line of the closure means to the data source can be produced, namely for data exchange between the data source and the electronic display devices received in the channel of the base body of the powering system according to the invention.

Particularly practically, the holding elements are connected detachably to the storage element.

The invention also relates to a method for powering multiple electronic display devices for displaying goods-related information with a system according to the invention for powering the multiple display devices, wherein the method comprises the following steps:

(A) receiving the display devices in the channel of the elongate base body, (B) connecting the closure means to an end portion of the base body, (C) connecting the supply lines of the closure means to a current source, and (D) powering the display devices by the current source.

The method according to the invention makes possible powering of the display devices with the supply current necessary for each of the display device, which can be produced in a simple and practical manner. Merely steps A to D have to be performed, namely without—as is the case with known solutions—costly cabling work having to be carried out.

It goes without saying that designating the steps by the letters A to D is not to be understood to mean that any chronological sequence is binding. Thus step A can be performed after step B, or step B after step A. Step C can be performed after step A or B, or alternatively prior to step A or prior to step B. Step D, on the other hand, is the last step, since it comprises the powering of the display devices by the current source.

Figure 2:
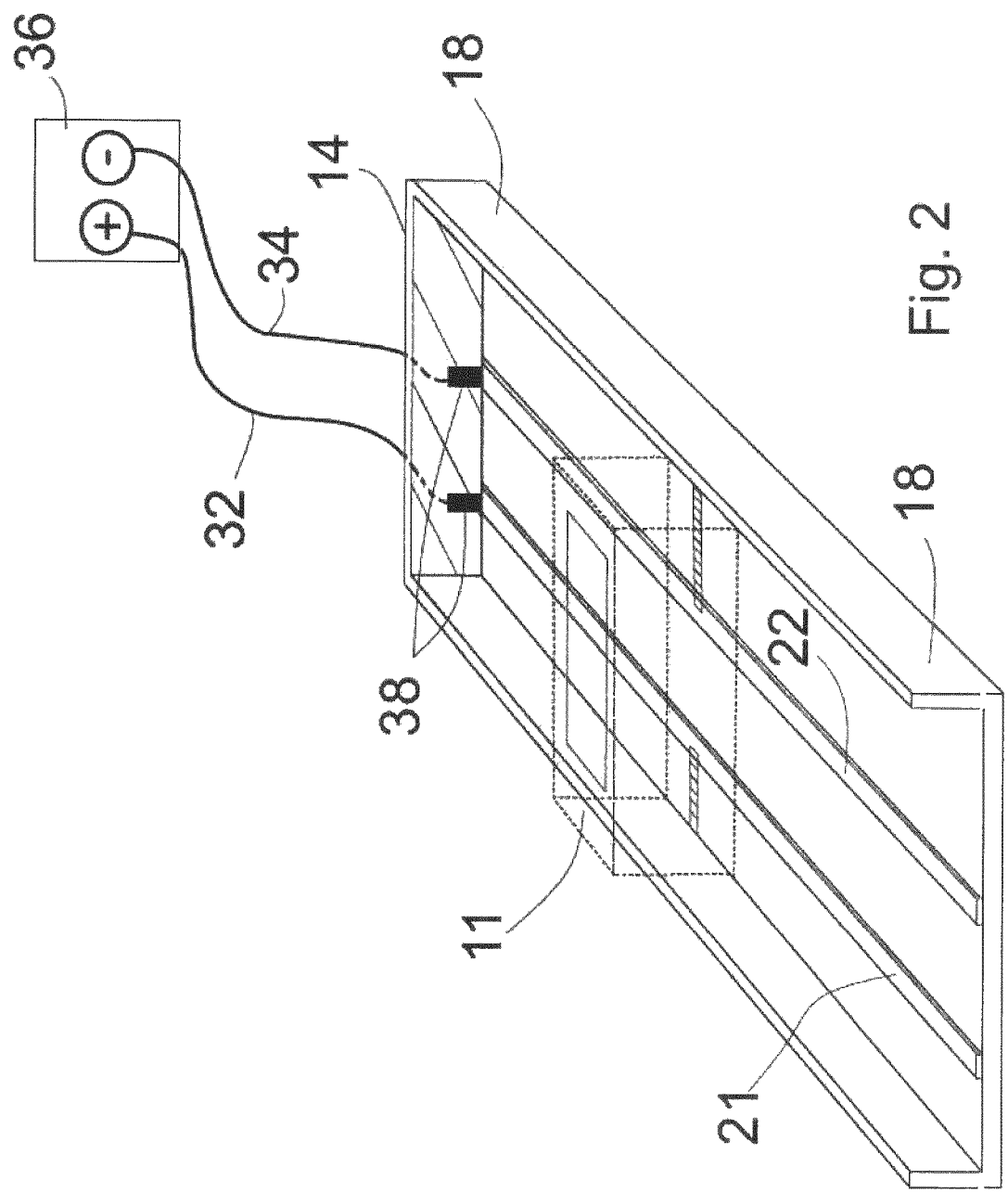
Figure 3:
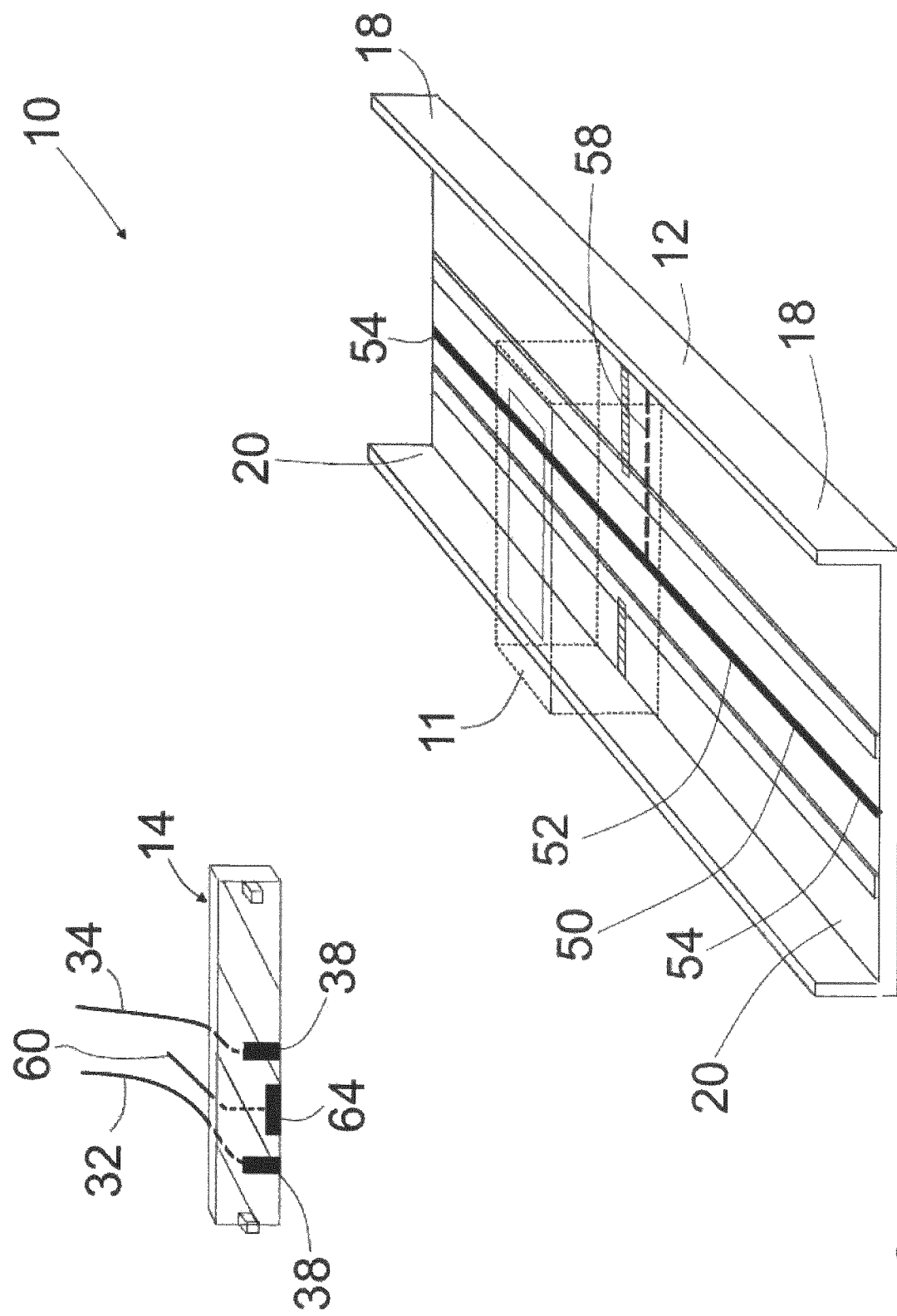
Figure 4:
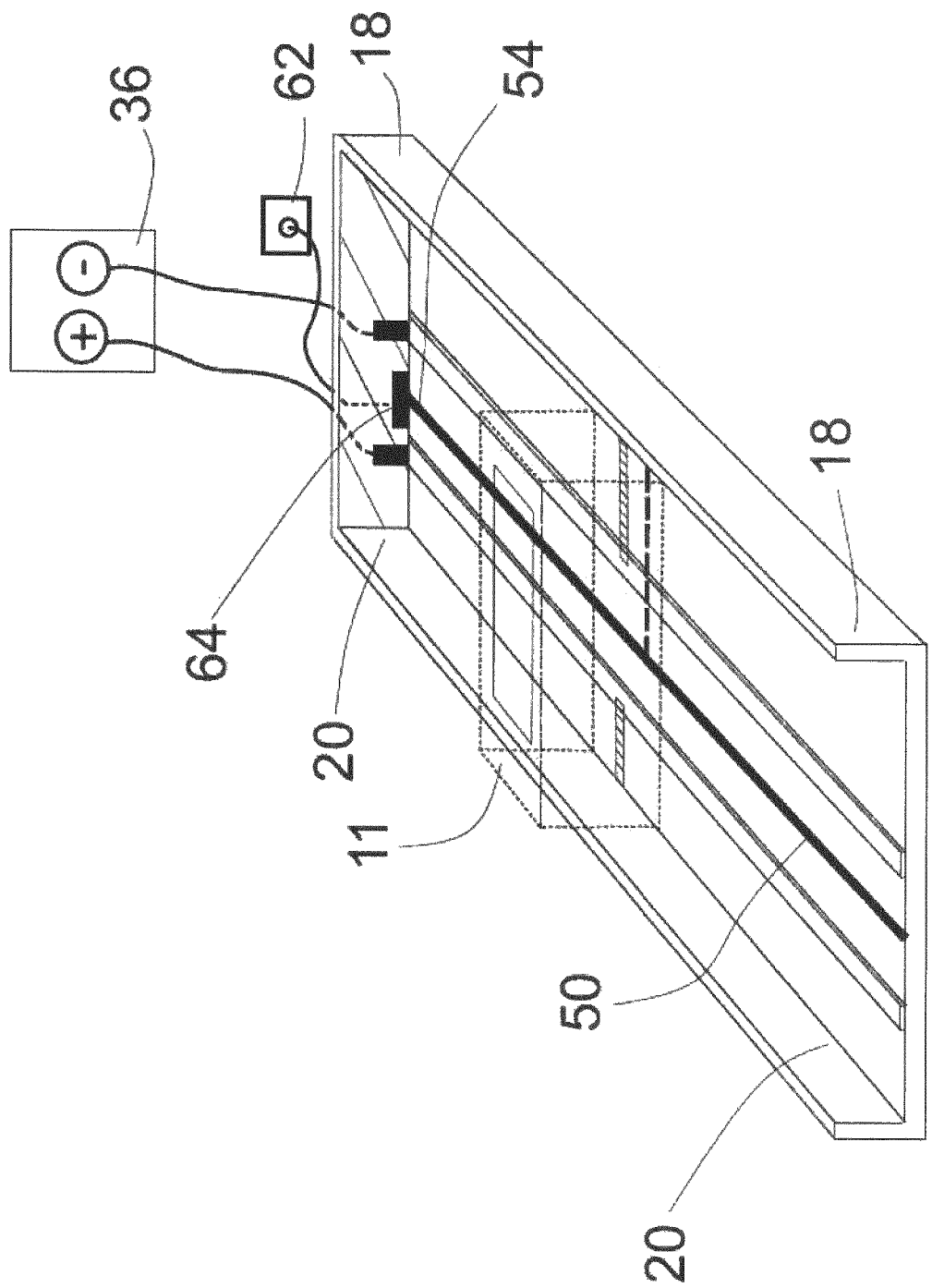
Figure 5:
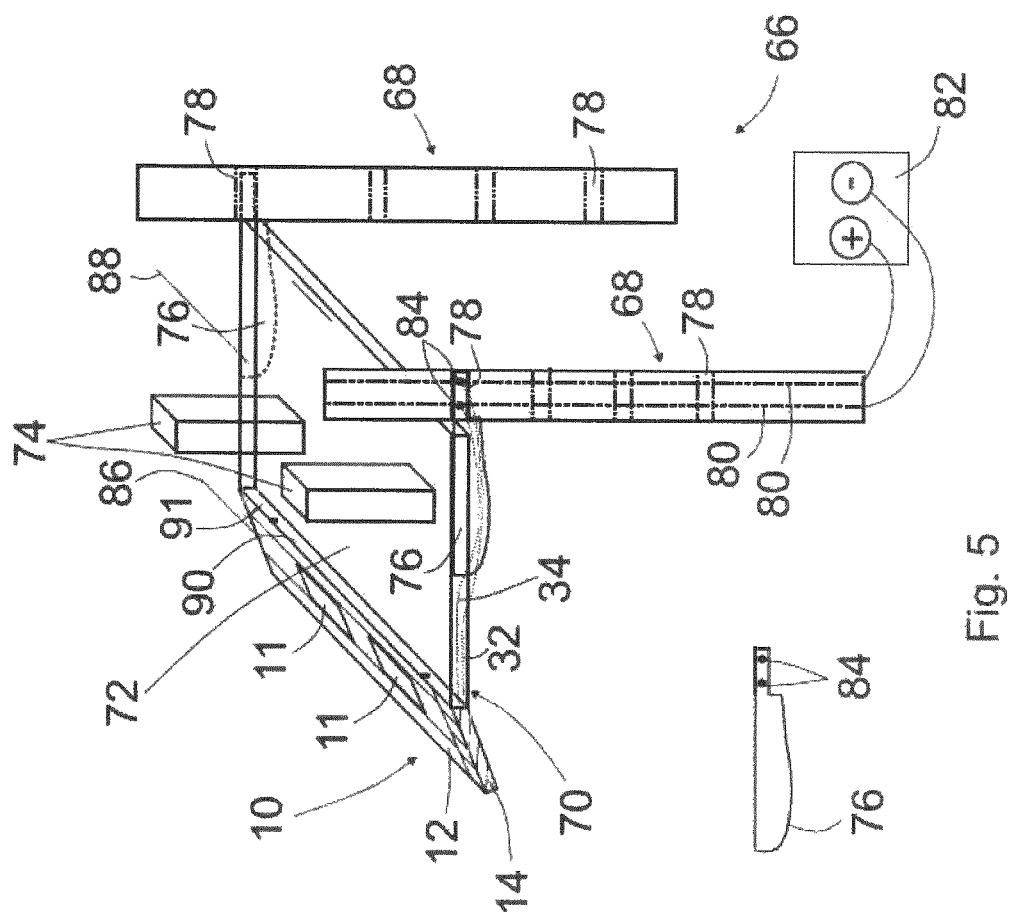
Figure 6:
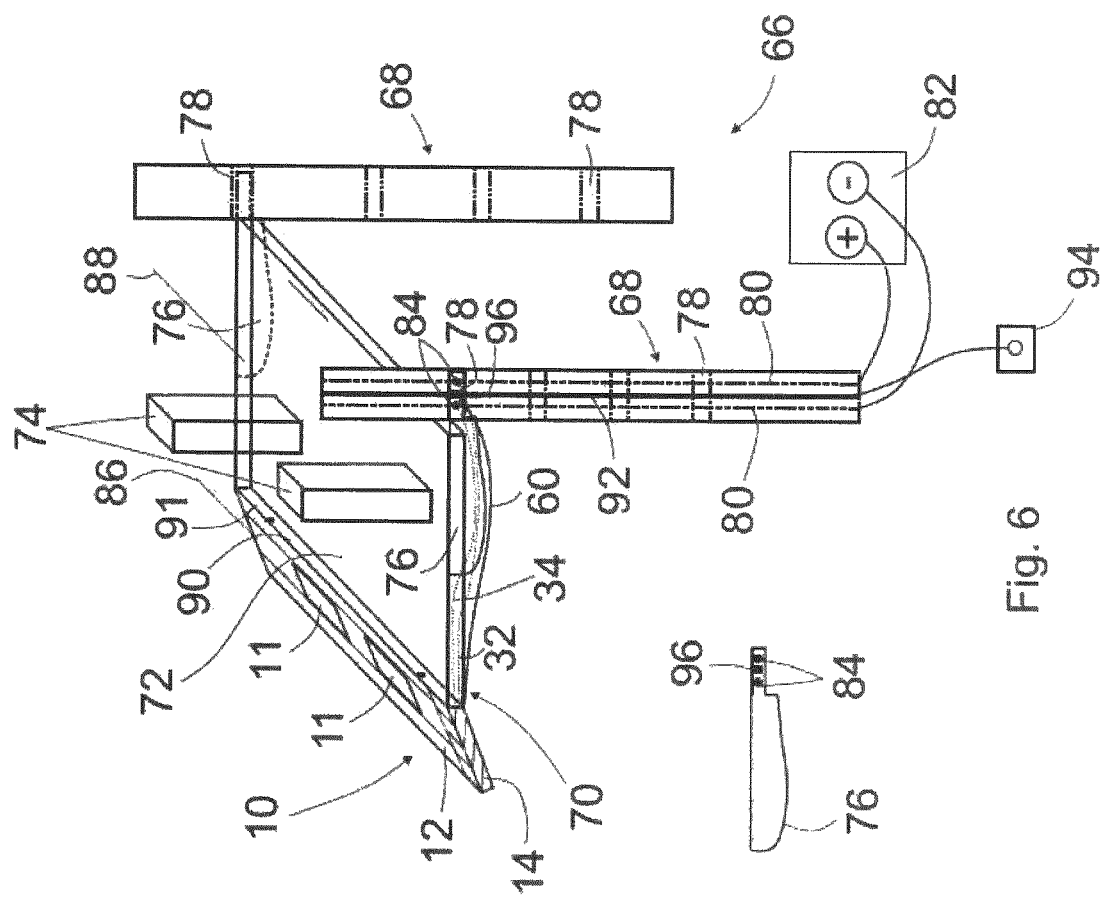
Figure 7:
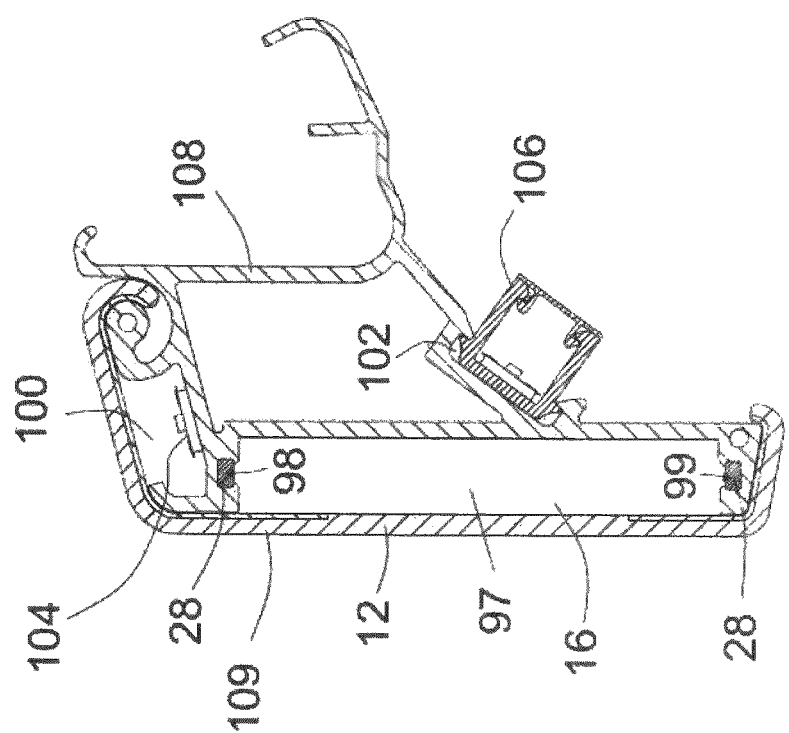
Figure 8:
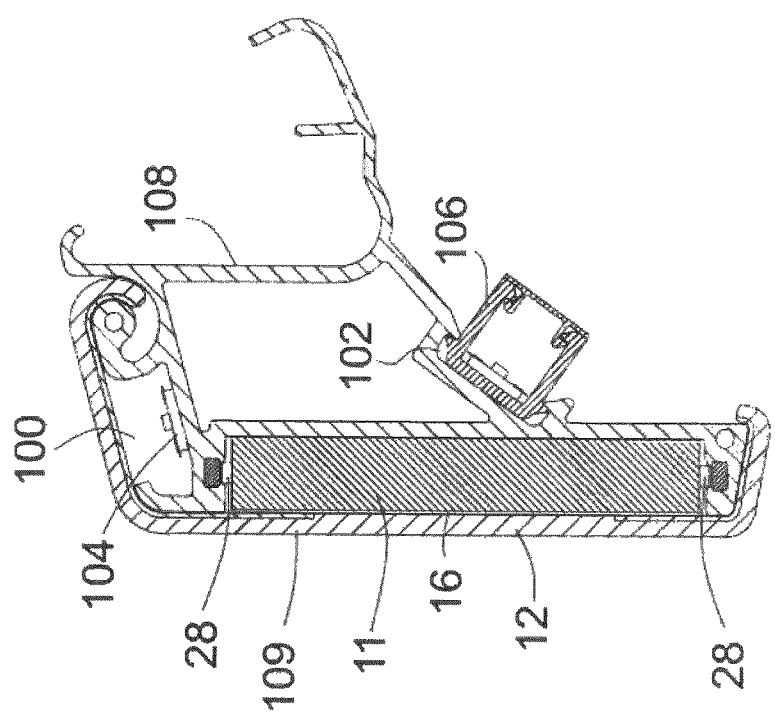
Figure 9:
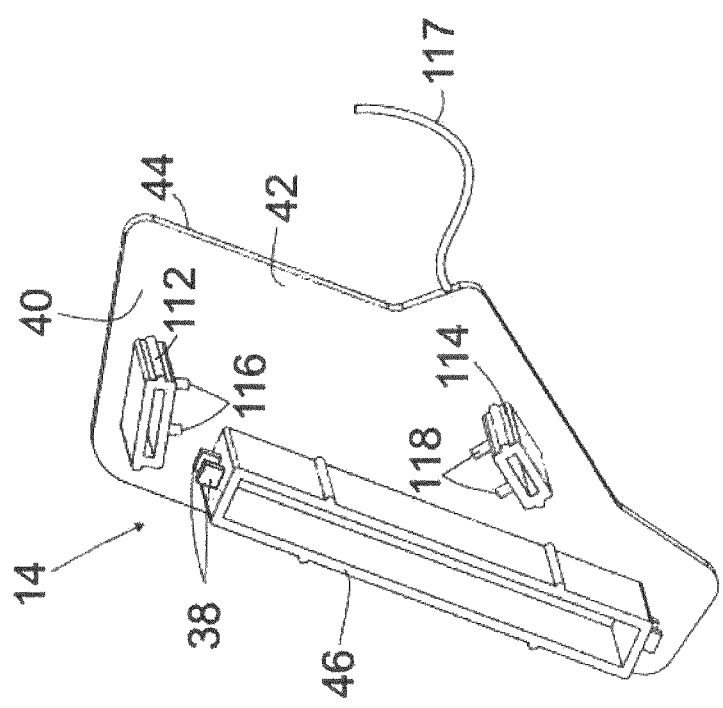
Figure 10B:
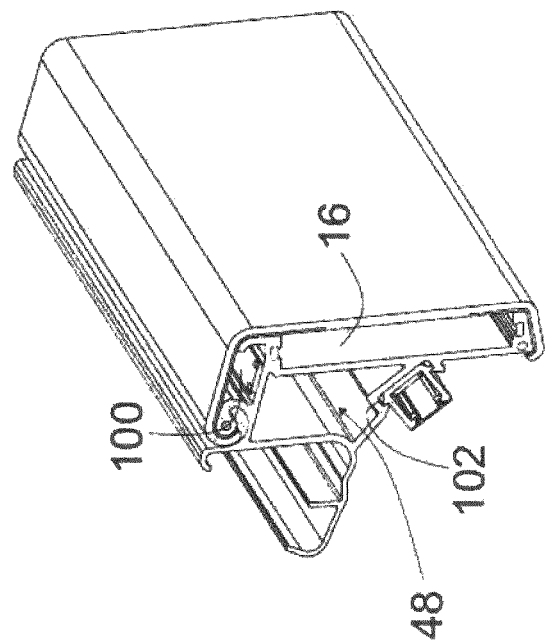
Figure 10A:
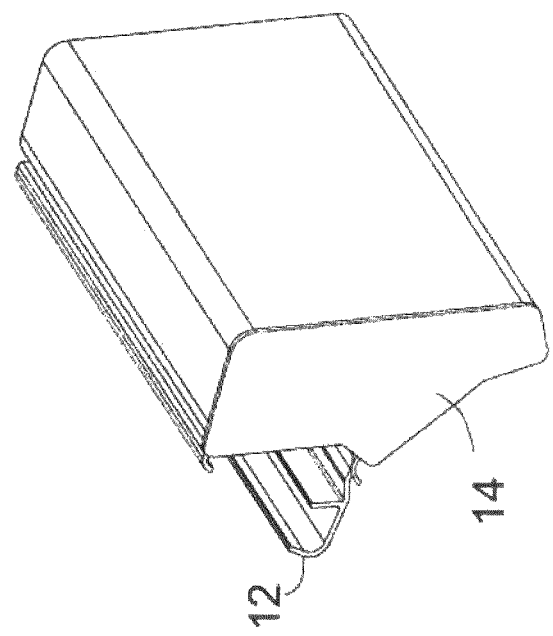

Below, exemplary embodiments of the invention will be discussed in greater detail with reference to the appended drawings. The drawings depict FIG. 1 is a schematic representation of a first exemplary embodiment of a system according to the invention for powering multiple electronic display devices for displaying goods-related information, FIG. 2 is the system of FIG. 1 with a current source, FIG. 3 is a schematic representation of a second exemplary embodiment of a system according to the invention for powering multiple electronic display devices for displaying goods-related information, FIG. 4 is the system of FIG. 3 with a current source and a data source, FIG. 5 is a schematic representation of a first exemplary embodiment of a goods presentation system according to the invention, FIG. 6 is a schematic representation of a second exemplary embodiment of a goods presentation system according to the invention, FIG. 7 is a sectional view through a base body of a third exemplary embodiment of a system according to the invention for powering multiple electronic display devices for displaying goods-related information, FIG. 8 is the representation of FIG. 7 with a display device, FIG. 9 is a three-dimensional representation of a closure means of the third exemplary embodiment of the system for powering the display devices, FIG. 10A is a three-dimensional representation of the base body of FIG. 7 together with a closure means, connected to the base body, of FIG. 9, and FIG. 10B is the base body of FIG. 10A without a closure means.

The system 10 for powering multiple electronic display devices 11 for displaying goods-related information—in FIGS. 1 to 4 only one each time is illustrated schematically—has an elongate extruded base body 12 made of a plastics material, and a closure means 14.

The base body 12 has a channel 16 extending over the entire length of the base body 12 for receiving the display devices 11.

The base body 12 has two opposed end portions 18. Each of the end portions 18 has one of two opposed channel end portions 20 of the channel 16.

The display devices 11 can be received in the channel 16, which is open or accessible on both end faces and on one long side, along the longitudinal axis 15 of the base body 12 in succession in the channel 16, or can be received or can be received in succession in the channel 16, forming a row extending along the longitudinal axis 15 of the base body 12. The display devices 11 can be received in force-fitting manner in the channel 16 from the long side, or the display devices 11 can be received in the channel 16 in clamping manner from the long side.

The system 10 has two current conductors 21 and 22 which in this exemplary embodiment are both arranged in the channel 16 or which are both completely or entirely arranged in the channel 16. Each current conductor 21, 22 is in the form of a rectilinear printed conductor 21, 22. Each printed conductor 21, 22 is extruded onto the base body 12.

Each of the current conductors 21 and 22 has two current-conductor end portions 24 and 26 and an intermediate portion 29, the current-conductor end portions 24 and 26 being connected together in each case by the respective intermediate portion 29. The intermediate portion 29 of each current conductor 21 and 22 is arranged in the channel 16, and one in each case of the current-conductor end portions 24 and 26 of each current conductor 21 and 22 is arranged or completely or entirely arranged in one of the two opposed channel end portions 20 in each case. However, according to the invention of course a limitation to an arrangement or a complete arrangement of the current-conductor end portions 24 and 26 in the channel end portions 20 is not provided. Thus at least one of the current-conductor end portions 24 and 26 in an alternative exemplary embodiment may also be arranged with a partial portion 31 outside the channel 16 and be arranged with another partial portion 27 in the channel end portion 20, as illustrated schematically in FIG. 1.

By the display devices 11 being received in the channel 16, in each case one power supply contact 28 of each display device 11 can be contacted in electrically conductive manner with one in each case of the current conductors 21 and 22.

The closure means 14 has two electrical supply lines 32 and 34 which are provided for producing a connection to a current source 36 (cf. also FIG. 2).

The closure means 14 can be connected to each of the two opposed end portions 18 of the base body 12. By connecting the closure means 14 to one of the two end portions 18 of the base body 12, in each case a supply-line end portion 38 of each of the supply lines 32 and 34 can be contacted in electrically conductive manner with in each case one current-conductor end portion 24 or 26 of those current-conductor end portions which are arranged in the channel end portion 20 of the end portion 18 of the base body 12, the end portion 18 being that end portion 18 which is provided for producing the connection to the closure means 14. FIG. 2 in this case illustrates the state in which the closure means 14 is connected to the rear end portion 18, the contact of the supply-line end portions 38 with the current-conductor end portions 24 in this exemplary embodiment taking place in each case by contacting the supply-line end portions 38 with the end faces of the respective current-conductor end portion 24.

To produce a force-fitting connection of the closure means 14 to the respective base body end portion 18, the closure means 14 has two insertable pins 17 which can be inserted into receptacles (not shown) which are provided on the end face on the end portions 18 of the base body 12.

The system 10 of FIGS. 3 and 4 differs from the system of FIGS. 1 and 2 in that this system 10 additionally has a data line 50 with an intermediate portion 52 and two data-line end portions 54. In the elongate or rectilinear data line 50, the intermediate portion 52 of the data line 50 is arranged in the channel 16 and also one in each case of the data-line end portions 54 is arranged in one in each case of the two opposed channel end portions 20, namely arranged completely, so that therefore the data line 50 is arranged in the channel 16 or is completely or entirely arranged in the channel 16. However, according to the invention here too of course a limitation to an arrangement or a complete arrangement of the data-line end portions 54 in the channel end portions 20 is not provided. Thus at least one of the data-line end portions 54 in an alternative exemplary embodiment may also be arranged with a partial portion outside the channel 16.

Unlike the system 10 of FIGS. 1 and 2, in the system of FIGS. 3 and 4 by the display devices 11 being received in the channel 16 also in each case a data line connector 58 of each display device 11 can be connected for data transmission to the data line 50. Unlike the system 10 of FIGS. 1 and 2, in the system of FIGS. 3 and 4 the closure means 14 additionally has a data supply line 60 which is provided for producing a data-transmitting connection to a data source 62 (cf. FIG. 4).

By connecting the closure means 14 to one of the end portions 18 of the base body 12, an end portion 64 of the data supply line 60 can be connected for data transmission to the data-line end portion 54 which is arranged in the channel end portion 20 of the end portion 18 of the base body 12 (cf. on this point also FIG. 4, which illustrates the associated situation) which is provided for producing the connection to the closure means 14.

The base body 12 of FIG. 7 of a third exemplary embodiment of a powering system 10 according to the invention differs from the base bodies 12 of FIGS. 1 to 4 substantially in that the channel 16 of the extruded base body 12 comprises three coherent partial regions 97, 98 and 99 which are rectangular in cross-section. In the smaller partial regions 98, 99 in each case, there is arranged in each case one of the current conductors 21, 22. In the sectional view of FIG. 8, there is illustrated the electrically conductive contact with the power supply contacts 28 of a display device 11 which is received in the channel 16.

Further, the base body 12 of FIGS. 7 and 9 has two further channels 100 and 102 which extend over the entire length of the base body 12. Both channels 100 and 102 are in each case formed open on a long side of the base body 12. In the channel 100 there is arranged a sensor 104 for signaling the entry of an object into a region spaced apart from the channel 100. In the other channel 102 there is arranged a light 106 for illuminating adjacent regions. By means of the claw-like region 108, the base body 12 is designed to be able to be hung on a storage device of a goods presentation system. The system 10 of FIGS. 7 and 8 further has an extruded covering element 109 for covering the channels 16 and 100.

The closure means 14 (cf. FIG. 9) of the system with the base body 12 of FIGS. 7 and 8 has a flat body 40 made of a plastics material with two opposed sides 42 and 44, and an insertable member 46 made of a plastics material which is connected to the side 42. The insertable member 46, for connecting the closure means 14 to an end portion 18 of the base body 12, can be received in force-fitting manner in the channel 16 by inserting it into the channel 16 on the end face—cf. on this point also FIG. 10A. The supply-line end portions 38 which can be contacted with the respective current-conductor end portions of the channel 16 are provided on the insertable member 46, with in this exemplary embodiment both the upper and the lower supply-line end portion 38 in each case being in the form of a twin contact.

The closure means 14 of FIG. 9 further has a second and a third insertable member 112, 114. The second insertable member 112 has two connection elements 116 for supplying voltage to the sensor 104, which can be contacted with supply lines, not shown, of the sensor 104 which are arranged in the channel 100 by inserting the insertable member 112 into the channel. The connection elements 116 themselves are in turn connected in electrically conductive manner in each case to one line in each case which is received in portions in a sheathing of a cable 117, in which also the supply lines for supplying power to the display devices are received in portions. Something similar also applies to the third insertable member 114. The third insertable member 114 has two connection elements 118 for supplying voltage to the light 106, which elements can be contacted with supply lines, not shown, of the light 106 which are arranged in the channel 102, by inserting the insertable member 112 into the channel. The connection elements 118 themselves are in turn connected in electrically conductive manner in each case to one line in each case which is received in portions in the sheathing of the cable 117, in which also the supply lines for supplying power to the display devices are received in portions. All the lines received in portions in the sheathing of the cable 117 may, in a goods presentation system according to the invention, be powered by way of respective connection elements provided on at least one holding element by the holding element being received in the respective receptacle of the holding post, namely for supplying power to the display devices 11, the sensor 104 and the light 106.

The end face 48 of the base body 12 (cf. FIG. 10A) can be covered by the flat body 40 of the closure means 14 in a visually very appealing manner by inserting the insertable member 46 and the insertable members 112 and 114 into the channel 16 on the end face.

In one exemplary embodiment of the method according to the invention for powering multiple electronic display devices 11 for displaying goods-related information with a system 10 of FIGS. 1 and 2, the method comprises the following steps:

(A) receiving the display devices 11 in the channel 16 of the elongate base body 12 (in FIGS. 1 and 2 only one display device 11 is illustrated schematically)

(B) connecting the closure means 14 to an end portion 18 of the base body 12 (cf. FIG. 2, which illustrates the connected state), (C) connecting the supply lines 32 and 34 of the closure means 14 to a current source 36 (cf. FIG. 2, which shows the supply lines 32 and 34 in the already-connected state), and (D) powering the display devices 11 by the current source 36.

The goods presentation system 66 of FIG. 5 comprises the system 10 for powering multiple electronic display devices 11 for displaying goods-related information, two holding posts 68 and a storage device 70, it being possible in alternative exemplary embodiments of course also for a higher number of holding posts and storage devices to be provided.

The storage device 70 has a storage element 72 for storing goods 74, and two holding elements 76.

The holding elements 76 are connected detachably to the storage element 72, namely by receptacles, not shown, on the storage element 72, into which tabs, not shown, of the holding elements 76 can be introduced.

Each holding post 68 has four receptacles 78, wherein one in each case of the holding elements 76 for holding the storage device 70 on the holding posts 68 can be received in each of the receptacles 78. FIG. 5 in such case already illustrates the state in which the holding elements 76 are received in one in each case of two receptacles 78 located opposite one another, with one receptacle 78 being located on the one holding post 68 and the other receptacles 78 on the other holding post 68.

One of the two holding posts 68 has two electrical conductors 80 which are provided for connecting to a current source 82.

One of the holding elements 76 has two electrical connection elements 84, with one in each case of the supply lines 32 or 34 of the closure means 14 being able to be connected in electrically conductive manner to each connection element 84.

Each connection element 84, by the holding element 76 being received in the respective receptacle 78 of the holding post 68, can be contacted in electrically conductive manner with one in each case of the conductors 80 of the holding post 68.

The elongate base body 12 of the powering system 10 can be attached to the storage device 70, FIG. 5 already illustrating the attached state. The storage element 72 is designed in elongate manner, and the elongate base body 12 can be attached to the storage device 70 in an arrangement in which a face 90 of the base body 12 which extends along the longitudinal axis 86 of the base body 12 faces a face 91 of the storage element 72 which extends along the longitudinal axis 88 of the storage element 72.

The goods presentation system 66 of FIG. 6 differs from the goods presentation system 66 of FIG. 5 in that the holding post 68 additionally has a data line 92 which is provided for connecting to a data source 94. The holding elements 76 with the electrical connection elements 84 additionally has a data line connector 96, the data supply line 60 of the closure means 14 being able to be connected to the data line connector 96. The data line connector 96 can be connected for data transmission to the data line 92 of the holding post 68 by the holding element 76 being received in the receptacle 78 of the holding post 68.

LIST OF REFERENCE CHARACTERS

10 system
11 display device
12 base body
14 closure means
15 longitudinal axis
16 channel
17 insertable pins
18 end portion
20 channel end portion
21 current conductor
22 current conductor
24 current-conductor end portion
26 current-conductor end portion
27 partial portion
28 power supply contact
29 intermediate portion 31 partial portion
32 supply line
34 supply line
36 current source
38 supply-line end portion
40 flat body
42 side
44 side
46 insertable member
48 end face
50 data line
52 intermediate portion
54 data-line end portion
58 data line connector
60 data supply line
62 data source
64 end portion
66 goods presentation system
68 holding post
70 storage device
72 storage element
74 goods
76 holding element
78 receptacle
80 conductor
82 current source
84 connection element
86 longitudinal axis of base body
88 longitudinal axis of storage element
90 face
91 face
92 holding post data line
94 data source
96 data line connector
97 partial region
98 partial region
99 partial region
100 channel
102 channel
104 sensor
106 light
108 claw-like region
109 covering element
112 insertable member
114 insertable member
116 connection element
117 cable
118 connection element

The invention claimed is:

1. A system for powering multiple electronic display devices for displaying goods-related information, comprising:
an elongate base body made of a plastic material; and
at least one closure means;
wherein the base body includes a channel extending over the entire length of the base body, for receiving the display devices;
wherein the base body includes two opposed end portions, wherein each of the end portions includes one of two opposed channel end portions of the channel;
wherein the display devices are operable to be received in the channel in a force-fitting manner by forming a detachable snap connection with the base body;
wherein the system has at least two current conductors;
wherein each of the current conductors includes two current-conductor end portions and an intermediate portion;
wherein the intermediate portion of each current conductor is arranged in the channel and an at least partial portion of one of the current-conductor end portions of each current conductor is arranged in one of the two opposed channel end portions;
wherein by the display devices being received in the channel, a power supply contact of each display device is operable to be contacted in electrically conductive manner with one of the current conductors;
wherein the closure means includes at least two electrical supply lines which are provided for producing a connection to a current source;
wherein the closure means are operable to be connected to at least one of the two opposed end portions of the base body;
wherein by connecting the closure means to the end portion of the base body, a supply-line end portion of each of the supply lines is operable to be contacted in electrically conductive manner with the at least partial portion of one current-conductor end portion of the current-conductor end portions which are arranged in the channel end portion of the end portion of the base body.

2. The system according to claim 1, wherein the closure means includes a flat body made of a plastics material with two opposed sides, and at least one insertable member made of a plastics material which is connected to one of the two sides, wherein the insertable member for connecting the closure means to the end portion of the base body is operable to be received in force-fitting manner in the channel by inserting it into the channel on the end face.

3. The system according to claim 2, wherein the supply-line end portions are operable to be contacted with the current-conductor end portions and are provided on the insertable member.

4. The system according to claim 3, wherein the end face of the base body is operable to be covered by the flat body by inserting the insertable member into the channel on the end face.

5. The system according to claim 4, wherein the system includes at least one data line, wherein the data line has an intermediate portion and two data-line end portions, wherein the intermediate portion of the data line is arranged in the channel and an at least partial portion of one of the data-line end portions is arranged in one of the two opposed channel end portions, wherein by the display devices being received in the channel, a data line connector of each display device is operable to be connected for data transmission to the data line, wherein the closure means includes at least one data supply line which is provided for producing a data-transmitting connection to a data source, wherein by connecting the closure means to the end portion of the base body an end portion of the data supply line is operable to be connected for data transmission to the at least partial portion of the data-line end portion which is arranged in the channel end portion of the end portion of the base body.

6. The system according to claim 5, wherein the supply-line end portions which is operable to be contacted with the current-conductor end portions and the end portion of the data supply line which is operable to be connected to one of the data-line end portions are provided on the insertable member.

7. The system according to claim 6, wherein the closure means is operable to be connected detachably to at least one of the two opposed end portions of the base body.

8. A goods presentation system, comprising:
a system according to claim 7;

at least two holding posts; and at least one storage device;

wherein the storage device includes a storage element for storing goods, and two holding elements;

wherein the holding elements are connected to the storage element;

wherein each holding post includes at least one receptacle, in which one of the holding elements for holding the storage device on the holding posts is operable to be received;

wherein at least one of the holding posts includes at least two electrical conductors which are provided for connecting to a current source;

wherein at least one of the holding elements includes at least two electrical connection elements, wherein one of the supply lines of the closure means is operable to be connected to each connection element;

wherein each connection element by the holding element being received in the receptacle of the holding post is operable to be contacted in electrically conductive manner with one of the conductors of the holding post.

9. The goods presentation system according to claim 8, wherein the elongate base body is operable to be attached to the storage device.

10. The goods presentation system according to claim 9, wherein the storage element is formed in elongate manner, wherein the elongate base body is operable to be attached to the storage device in an arrangement in which a face of the base body which extends along the longitudinal axis of the base body faces a face of the storage element which extends along the longitudinal axis of the storage element.

11. The goods presentation system according to claim 10, wherein at least one of the holding posts includes at least one data line which is provided for connecting to the data source, wherein at least one of the holding elements includes at least one data line connector, wherein the data supply line of the closure means is operable to be connected to the data line connector, wherein the data line connector by the holding element being received in the receptacle of the holding post is operable to be connected for data transmission to the data line of the holding post.

12. The goods presentation system according to claim 11, wherein the holding elements are connected detachably to the storage element.

13. A method for powering multiple electronic display devices for displaying goods-related information with a system according to claim 7, comprising the steps of:

receiving the display devices in the channel of the elongate base body;

connecting the closure means to an end portion of the base body;

connecting the supply lines of the closure means to the current source; and powering the display devices by the current source.

* * * * *